Dec. 9, 1958  D. E. SCOTT  2,863,671
COMBINATION TAIL LAMP AND FUEL TANK INLET ASSEMBLY
Filed March 9, 1956  3 Sheets-Sheet 1
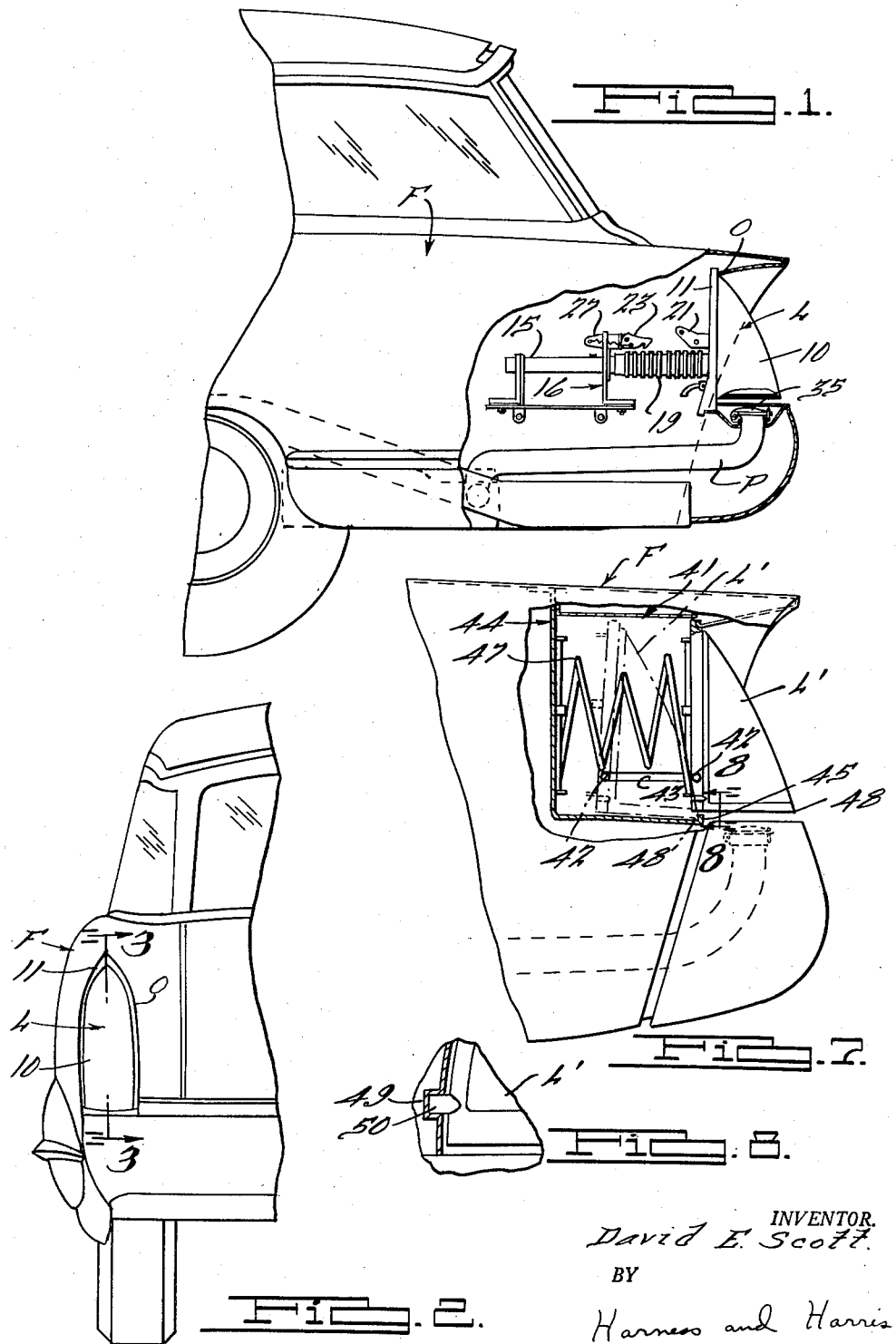
INVENTOR.
David E. Scott.
BY
Harness and Harris
ATTORNEYS Dec. 9, 1958 D. E. SCOTT 2,863,671
COMBINATION TAIL LAMP AND FUEL TANK INLET ASSEMBLY
Filed March 9, 1956 3 Sheets-Sheet 2
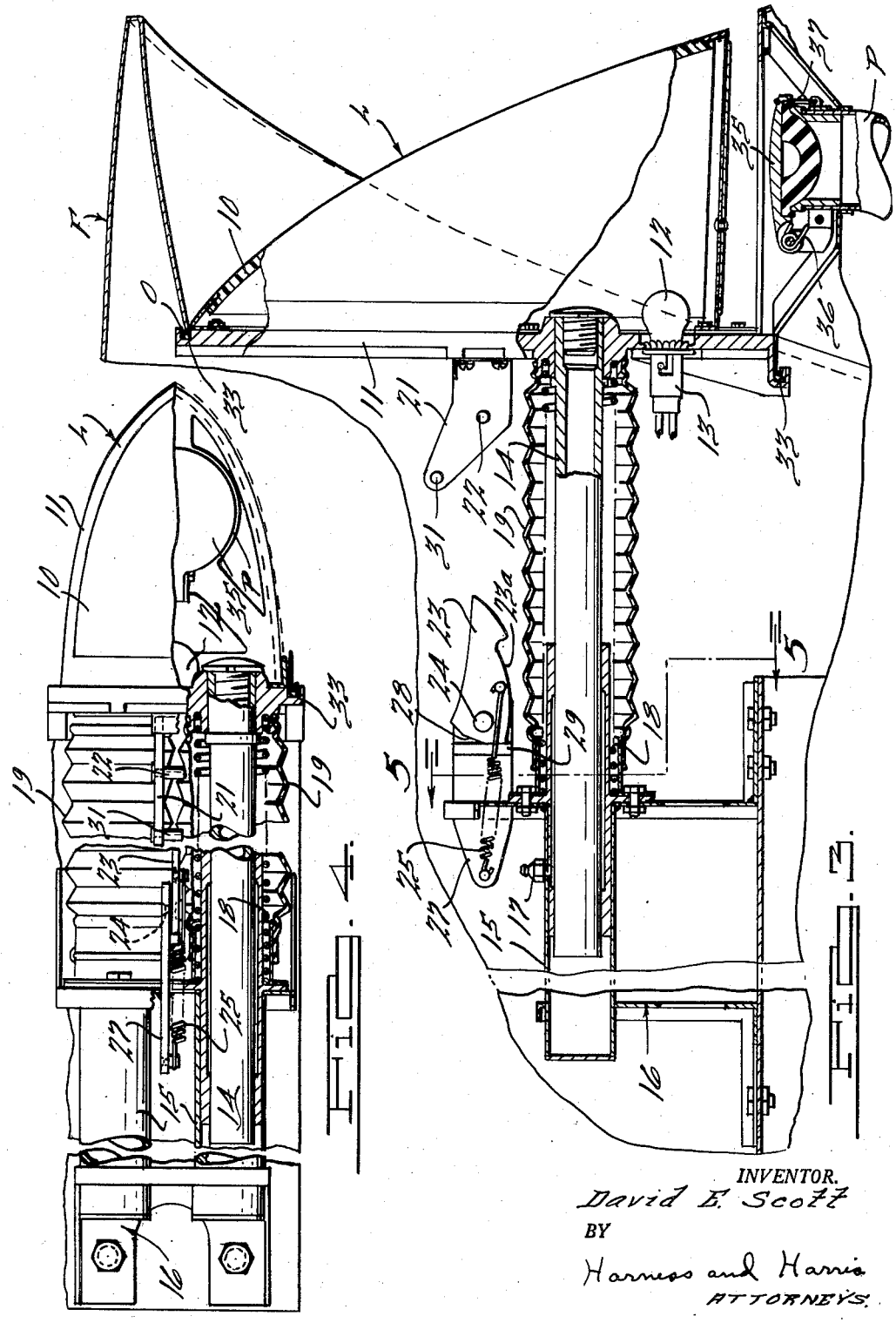
INVENTOR.
David E. Scott
BY
Harness and Harris
ATTORNEYS.

Dec. 9, 1958 D. E. SCOTT 2,863,671
COMBINATION TAIL LAMP AND FUEL TANK INLET ASSEMBLY
Filed March 9, 1956 3 Sheets-Sheet 3
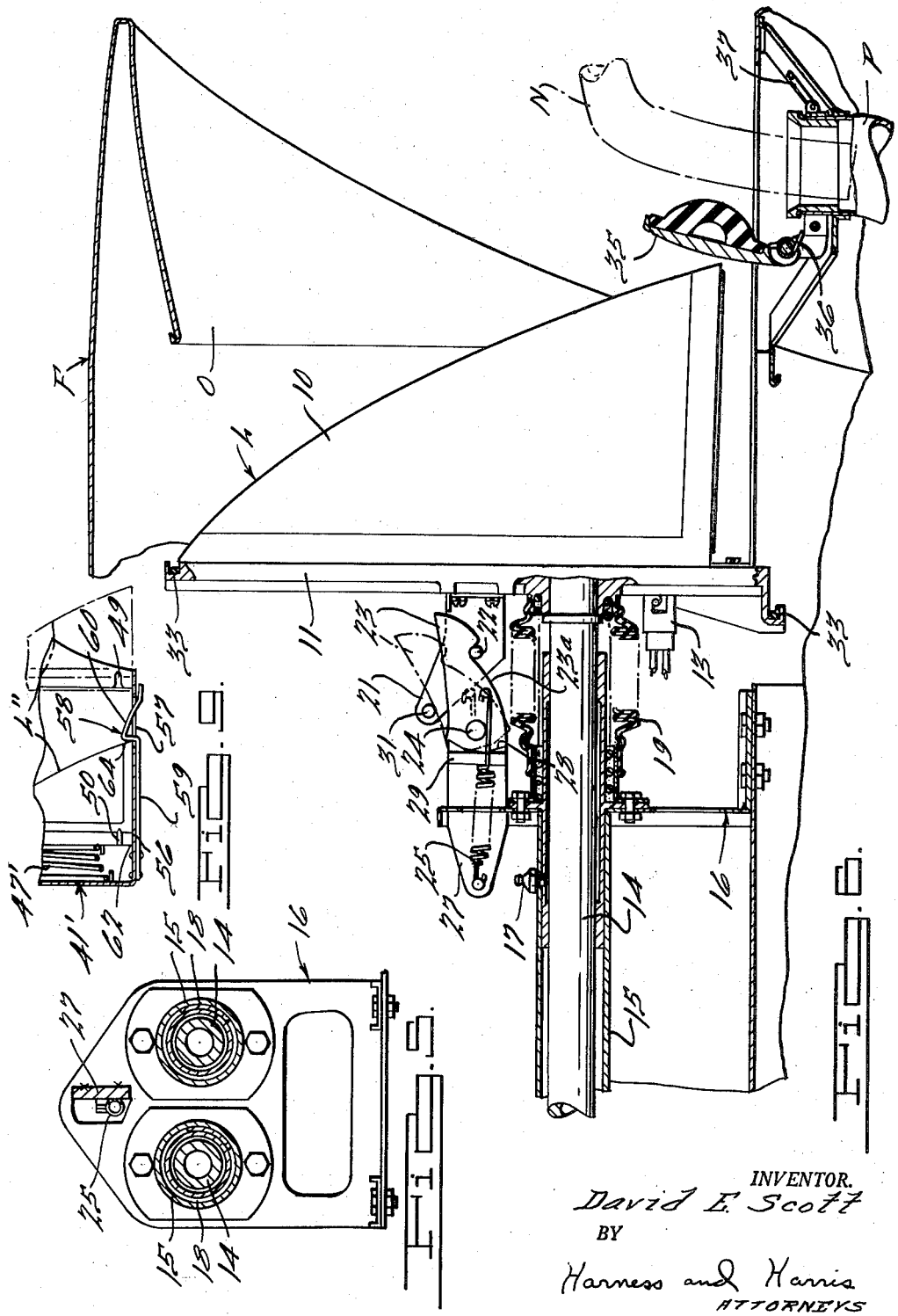
INVENTOR.
David E. Scott
BY
Harness and Harris
ATTORNEYS

2,863,671

COMBINATION TAIL LAMP AND FUEL TANK INLET ASSEMBLY

David E. Scott, Royal Oak, Mich., assignor to Chrysler Corporation, Highland Park, Mich., a corporation of Delaware Application March 9, 1956, Serial No. 570,653

6 Claims. (Cl. 280—152)

This invention relates to a slidably mounted, vehicle fender supported, tail lamp assembly that is cooperatively related with a fender concealed fuel tank inlet pipe such that reciprocating movement of the tail lamp assembly provides access to and concealment of the associated fuel tank inlet pipe.

It is a primary object of this invention to provide a slidable, fender mounted, tail lamp assembly that will function as a fender port through which access may be had with a normally concealed fuel tank inlet pipe.

It is another object of this invention to provide a motor vehicle fender construction having a tail lamp assembly slidably mounted therein for fore and aft reciprocating movement and including means to anchor the tail lamp assembly in either of its fore and aft movement limiting positions.

It is still another object of this invention to provide a tail lamp assembly and concealed fuel tank inlet pipe arrangement that is simple and relatively inexpensive, one that lends itself to present day vehicle styling, and one that permits the use of a normally concealed fuel tank inlet pipe located such that fuel overflow therefrom will not discharge onto a visible part of the vehicle body.

Other objects and advantages of this invention will be readily apparent from a reading of the following description and a consideration of the related drawings wherein:

Fig. 1 is a fragmentary side elevational view of the rear quarter of a motor vehicle embodying this invention, parts being broken away and shown in section to clearly disclose a preferred form of the invention;

Fig. 2 is a fragmentary rear end elevational view of the vehicle structure shown in Fig. 1;

Fig. 3 is an enlarged, fragmentary, sectional elevational view taken along the line 3—3 of Fig. 2 with the fuel inlet pipe concealed by the extended tail lamp assembly;

Fig. 4 is a plan elevational view, partly in section, of the structure shown in Fig. 3;

Fig. 5 is a sectional elevational view taken along the line 5—5 of Fig. 3;

Fig. 6 is another fragmentary sectional elevational view, similar to Fig. 3, but showing the slidable tail lamp assembly retracted and latched in its forward limiting position to provide access to the fuel tank inlet pipe;

Fig. 7 is a fragmentary side elevational view, partly in section, of a vehicle fender embodying another form of this invention;

Fig. 8 is an enlarged sectional elevational view taken along the line 8—8 of Fig. 7; and Fig. 9 is a fragmentary sectional elevational view of another form of latching means for the slidable lamp assembly.

It is currently the preferred practice to conceal motor vehicle fuel tank inlet pipes due to the fact that they do not improve the vehicle appearance, and further, they provide a source of unsightly dirt accumulation due to fuel overflow from the inlet pipe onto the exterior of the vehicle adjacent the inlet pipe. Also by having the fuel tank inlet pipe arranged so that it is necessary to reach it through a port that pierces the vehicle fender or some other body portion, additional cost is involved in producing the body portion that must accommodate the fuel tank inlet pipe.

This invention proposes the concealment of the fuel tank inlet pipe within a vehicle fender and the slidable mounting of the associated fender lamp assembly in the fender such that the lamp assembly may be retracted or shifted forwardly on its mounting to provide an access opening through the rear of the fender to reach the normally concealed fuel tank inlet pipe. By such an arrangement the opening through the fender that receives the lamp assembly is used for a dual purpose, that is, to seat the lamp assembly and to also provide an access port to the fuel tank inlet pipe. Accordingly, there is no need to provide a separate port in the fender or any other body portion in order to provide an access opening to the fender concealed fuel tank inlet pipe. Furthermore, the size of the lamp assembly opening in the fender or body is usually so large that when the lamp assembly is removed therefrom there is ample room to insert therein a fuel supply hose nozzle without damaging or marring the portions of the fender or body adjacent to the opening. This is not the case with certain types of access ports presently provided in motor vehicle bodies having concealed fuel tank inlet pipes.

In the drawings F represents the rear fender of a motor vehicle although obviously it could refer to a front fender or any other vehicle body portion that has a lamp assembly associated therewith and a fuel supply pipe, or the like, concealed therein. Mounted in the rear end of the fender F is a tail lamp assembly L. Lamp assembly L is of such a shape and size and is so mounted in the fender F that it normally closes off the lamp receiving opening O formed in the rear end of the fender F. The lamp assembly L is slidably supported in the fender F so that it may have a fore and aft reciprocating movement. Figs. 1–4 show the lamp assembly L in its normal, extended, rearwardly located, position and Fig. 6 shows the lamp assembly L in its forwardly located, retracted position where it provides access to the fuel tank filler pipe P.

The lamp assembly L comprises a lens 10 that is mounted in a surrounding frame or bezel 11. Lens frame 11 supports a conventional light bulb 12 that is detachably connected in a socket 13 by a bayonet type connection or the like. Lens frame 11 also has mounted thereon and projecting forwardly from the rear side thereof a pair of spaced apart, aligned, tubular elements 14 that provide a part of the slide mounting for the lamp assembly L. Each of the tubular elements 14 is telescopically mounted in a mating tubular element 15 that is carried by a support frame 16. Support frame 16 is bolted or otherwise secured to the interior of the fender F or to the adjacent interiorly disposed vehicle body structure. The body supported tubular elements 15 may include lubrication fittings 17 so that the matingly engaged tubular slide elements 14, 15 can be properly lubricated at all times. A compression type spring 18 encircles each of the engaged tubular elements 14, 15 and extends between the support frame 16 and the rear side of the lens frame 11 so that the springs 18 will continuously urge the lamp assembly L towards its rearwardly located normal position as is shown in Figs. 1–4. A flexible boot 19 encircles each of the compression springs 18 and prevents the deposition of foreign matter on the slidably engaged portions of the tubular elements 14, 15 and on the springs 18.

The rear side of the lens frame 11 has fixedly mounted thereon a forwardly projecting finger or stub strip 21 that provides a part of a latch mechanism adapted to anchor the lamp assembly L in its forwardmost (Fig. 6)

retracted position. Finger portion or stub strip 21 carries a laterally extending pin element 22 that is adapted to be latchingly engaged with a latch hook 23 when the lamp assembly L is moved to its forwardmost retracted position as shown in Fig. 6. The latch hook 23 is pivotally mounted at 24 on a portion of the body mounted support frame 16. An overcenter spring 25 is connected between the support frame portion 27 and the pivotally mounted latch hook 23 such that the hook 23 can be held in either a latching (full line) or unlatched (broken line) position each of which is shown in Fig. 6. The rear edge 28 of the latch hook 23 is formed with a contour to provide a pair of stop portions. These stop portions engagingly cooperate with the lip 29 on the frame portion 27 and with the springs 25 to assist in anchoring the latch hook 23 in either its latching or unlatched positions.

From Fig. 6 it will be noted that when the lamp assembly L is in its forwardmost retracted position the latch hook 23 is engaged with the lamp assembly mounted latch pin 22. To release the latch hook 23 from the pin 22, so that lamp assembly L may be extended rearwardly to its normal position, it is merely necessary to move the lamp assembly L slightly farther forward to additionally compress the springs 18 and this will cause the latch hook lower edge portion 23a to ride on the pin 22 and to cam the hook 23 upwardly and disengage the hook notch from the latch pin 22. Movement of the hook 23 upwardly by the cam action of its cam portion 23a is effective to cause the overcenter spring 25 to snap the hook 23 upwardly to its unlatched, raised (broken lines Fig. 6) position. The lamp assembly L is now free to be moved rearwardly to its extended normal position (full lines Fig. 6) by the action of the compressed springs 18. As the lamp assembly L moves rearwardly under the action of the compressed springs 18, the other laterally extending pin 31 on the lens frame finger or stub strip 21 will cam the pivoted latch hook 23 downwardly to a position when the overcenter spring 25 will then snap the latch hook 23 back to its normal (Fig. 3) position. The hook 23 is then conditioned for a subsequent latching engagement with the latch pin 22 of the lamp assembly L when the lamp assembly L is subsequently moved forwardly to uncover the fuel tank filler pipe.

It will be noted that the lens frame 11 of the lamp assembly L is formed with a peripheral groove 33 that receives a resilient sealing strip of rubber or the like. The resilient seal in the lens frame groove 33 is adapted to sealingly engage the edge portions of the opening O in the fender F when the lamp assembly L has been extended rearwardly to its normal position.

From Fig. 6 it will be obvious that when the lamp assembly L has been moved forwardly and latched in its forwardmost retracted position that then the fuel tank inlet pipe P is readily accessible. With movement of the lamp assembly L to its forwardmost position a considerably oversize access port is thereby provided through fender opening O to reach the fuel tank inlet pipe P. This large access port O permits the fuel supply nozzle N to be quickly and easily inserted in the top of the fuel intake pipe P without danger of the nozzle N bearing against or marring any adjacent portions of the vehicle fender or body. Also due to the fuel supply pipe P being located within the fender enclosed area but spaced from surfaces thereof, it is thought to be obvious from the drawings that any overflow of the fuel from the supply pipe P during tank filling, or at any other time, will permit the fuel spillage to drain directly to the ground beneath the pipe P without running across any of the exposed finished surfaces of the vehicle body. This prevents unsightly stains or dirt spots on the car exterior surfaces as well as preventing damage to the surfaces of the vehicle by chemical action of the spilled fuel. Fuel inlet pipe P is fitted with a pivotally mounted closure cap 35. The pivot connection for the cap 35 includes a torsion spring 36 that automatically raises the cap 35 from the end of the pipe P when the cap locking bail 37 is disengaged from the cap as shown in Fig. 6.

Fig. 7 shows a simplified form of the construction shown in Figs. 1–6. In this form of the invention the lamp assembly L' is slidably mounted in a fender supported interior housing 41 for reciprocating forward and aft movement. A pin and slot connection 42, 43 respectively and a guideway slide mechanism 49, 50 slidably connect the lamp assembly L' to the receiving housing 41. Housing 41 is carried by a support frame 44 that is fixedly mounted to the vehicle body, within the fender F, by welding or any suitable connecting means. The lower or bottom wall of the frame 44 includes a step formation 45 that provides a retaining seat for the lamp assembly L' when it has been moved to its retracted forwardmost position. To latch the lamp assembly L' in its forwardmost position, it is merely necessary to first push the assembly L' forwardly on its slide mountings against the resisting action of the compresison spring 47. Thereafter, when the lamp assembly L' is retracted forwardly to its forwardmost position the rear portion of the lamp assembly L' is tilted downwardly so that the lower edge portion 48 will be seated in the step formation 45 of the housing 44. Release of the lamp assembly L' from the step 45 is accomplished by merely pressing forwardly on the lamp assembly L and at the same time tilting the rear portion of the assembly upwardly. The compressed spring 47 will then return the lamp assembly L' to its rearmost normal position as shown in full lines in Fig. 7.

Fig. 9 merely shows another type of lamp assembly latching mechanism 58 that could be used with either of the previously described forms of this invention. The lamp assembly L" has slideway structure 50 adapted to be matingly engaged with complementary slideway structure (not shown) carried by the housing 41'. The bottom wall 56 of the housing 41' has an aperture 57 therein through which a stop member 58 protrudes upwardly. Stop member 58 is connected to the housing wall 56 by a resilient lever arm 59 which permits depression of the stop member 58. As lamp assembly L" is pushed forwardly from its rearwardly located, normal (broken line) position to its retracted (fuel line) position, the lower rear edge portion 62 of the lamp assembly L" will engage the cam portion 60 of the stop member 58 and depress the stop 58 so that the lamp assembly L" may be moved to its forwardmost retracted position as shown. The vertical face 64 of stop 58 will retain the lamp assembly L" in its forward, retracted position. When the stop member 58 is subsequently fully depressed manually, the compressed spring 47' will force the lamp assembly L" to its rearmost normal position.

It is to be understood that the slideway means and the latching means herein disclosed for the shiftable lamp assemblies L, L' and L" are merely representative of a group of known, useable, mechanisms and are susceptible of variation except as limited specifically by the claims.

I claim:

1. A vehicle body member having an opening therein adapted to receive a lamp assembly, means slidably mounting a lamp assembly on said body member to permit movement of the lamp assembly from a first position normally closing said body member opening to a second position interiorly of said body member whereby access may be had to the interior of the body member through said opening, resilient means resisting movement of said lamp assembly from said first to said second position, and means to latch said slidably mounted lamp assembly in said second position, said latch means including an overcenter spring mechanism to retain the latch means in both a predetermined latched and an unlatched position.

2. A vehicle body member having an opening therein adapted to receive a lamp assembly, means slidably mounting a lamp assembly on said body member to permit movement of the lamp assembly from a first position normally closing said body member opening to a second position interiorly of said body member whereby access may be had to the interior of the body member through said opening, resilient means normally resisting movement of said lamp assembly from said first to said second position, and means to latch said slidably mounted lamp assembly in said second position, said latch means comprising a step formation interiorly of the body member engageable with said lamp assembly when said lamp assembly is in its second position and is tilted with respect to its first position.

3. A vehicle body fender having an opening therein adapted to receive a lamp assembly, means slidably mounting a lamp assembly on said body fender to permit movement of the lamp assembly from a first position normally closing said body fender opening to a second position interiorly of said body fender whereby access may be had to the interior of the body fender through said opening, resilient means normally resisting movement of said lamp assembly from said first to said second position, and means to latch said slidably mounted lamp assembly in said second position, said latch means comprising a resiliently mounted stop means actuable by shifting movement of said lamp assembly from its first to its second position to effect latching engagement with said lamp assembly and manually releasable from latching engagement with said lamp assembly to permit movement of the lamp assembly from its second position.

4. A vehicle body fender having an opening therein adapted to receive and to be normally closed by a lamp assembly, means slidably mounting a lamp assembly within said body fender to permit movement of the lamp assembly from a first position normally closing said body fender opening to a second position interiorly of said body fender whereby access may be had to the interior of the body fender through said opening, means for latching said lamp assembly in said second position, and a container filler pipe normally concealed interiorly of said body fender by said lamp assembly and rendered accessible from the exterior of said body through said body fender opening by movement of said lamp assembly from its first position to its second position within the body fender.

5. A vehicle body member having an opening therein adapted to receive a lamp assembly, means slidably mounting a lamp assembly on said body member to permit movement of the lamp assembly from a first position normally closing said body member opening to a second position interiorly of said body member whereby access may be had to the interior of the body member through said opening, resilient means normally resisting movement of said lamp assembly from said first to said second position, means to latch said slidably mounted lamp assembly in said second position, and a container filler pipe normally concealed interiorly of said body member by said lamp assembly and rendered accessible from the exterior of said body member through said body opening by movement of said lamp assembly from its first position to its second position.

6. A vehicle body exterior member having a portion with an opening therein adapted to normally receive and be closed by a lamp assembly, means mounting said lamp assembly on said body exterior member providing for sliding movement of the lamp assembly from a first position normally closing said opening to an interiorly disposed second position wherein access may be had to the interior of the vehicle body exterior member through said opening, slideway means carried by said lamp assembly, mating slideway means mounted interiorly of said body exterior member and engaged with the lamp assembly slideway means, latch means engageable with said lamp assembly when said lamp assembly is moved to said second position to anchor said lamp assembly in said second position, resilient means continuously acting on said lamp assembly urging it to its first position, and a container filler pipe arranged interiorly of the vehicle body exterior member adjacent said opening and normally concealed when said lamp assembly is in its first position, said filler pipe being accessible from the exterior of said vehicle through said opening when said lamp assembly is in its second position.

References Cited in the file of this patent

UNITED STATES PATENTS

| | | |
|---|---|---|
| 2,157,361 | Urge | May 9, 1939 |
| 2,284,538 | Parkes | May 26, 1942 |
| 2,314,710 | Keller | Mar. 23, 1943 |
| 2,606,772 | Mead | Aug. 12, 1952 |